United States Patent Office 2,775,929
Patented Jan. 1, 1957

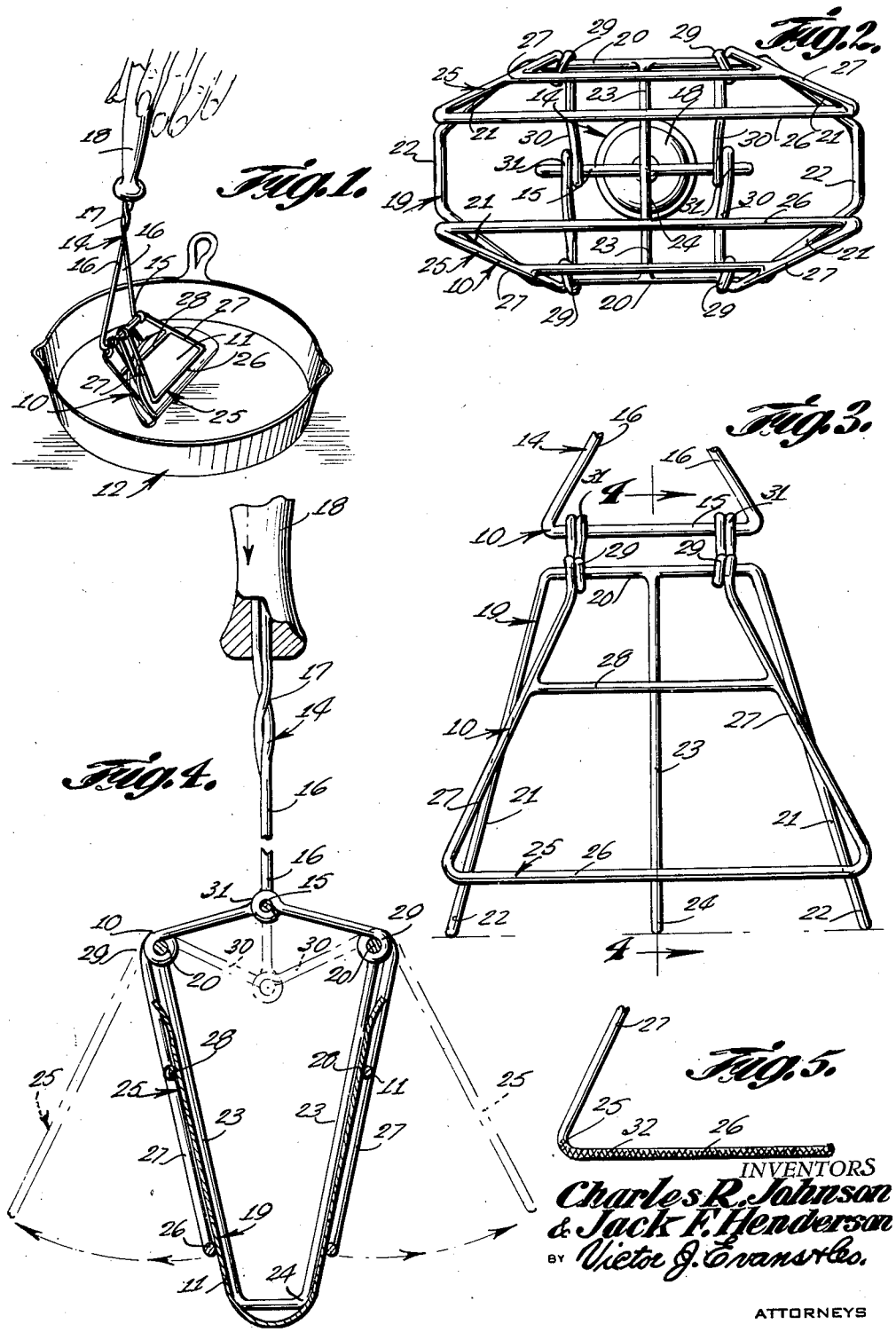

2,775,929

COOKING UTENSIL

Charles R. Johnson and Jack F. Henderson,
San Antonio, Tex.

Application November 17, 1954, Serial No. 469,351

3 Claims. (Cl. 99—426)

This invention relates to a cooking utensil, and more particularly to a cooking utensil for supporting foodstuffs such as tortillas and tacos.

Another object of the invention is to provide a cooking utensil which includes a handle and a substantially V-shaped body member, there being a pair of clamps mounted for movement towards and away from the body member whereby certain Spanish type or Mexican type foodstuffs known as tortillas or tacos can be cooked while being held in a manner so that the cooked article will have a U-shape whereby it can be readily filled with morsels of meat, salad, vegetables or the like.

A further object of the invention is to provide a cooking utensil which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing the cooking utensil of the present invention being used for supporting a tortilla or taco in a frying pan.

Figure 2 is a bottom plan view of the cooking utensil of the present invention.

Figure 3 is a fragmentary side elevational view of the cooking utensil.

Figure 4 is a sectional view taken on the line 4—4 of Figure 3.

Figure 5 is a fragmentary perspective view showing the knurling or roughened surface on one of the clamps for increasing the frictional contact between the utensil and the article of food being cooked.

Referring in detail to the drawings, the numeral 10 designates the cooking utensil of the present invention, and the cooking utensil is adapted to provide a support for a tortilla or taco 11 while the tortilla is being cooked as for example in a frying pan 12. The cooking utensil of the present invention includes a handle which is indicated generally by the numeral 14, and the handle 14 includes a base 15 and extending from the base 15 and formed integral therewith or secured thereto is a pair of angularly arranged arms 16. Portions of the arms 16 are twisted together as at 17, Figure 4, and the ends of the arms 16 are embedded in or secured in a hand grip 18.

The utensil further includes a body member 19 which has a substantially V- or U-shape as shown in Figure 4 so that the cooked tortilla will also have a substantially U-shape. The body member which is indicated by the numeral 19, includes a first pair of straight portions 20 which are arranged in spaced parallel relation with respect to each other. Extending from each end of each of the first portions 20 is a pair of second portions 21, and the portions 21 are arranged angularly with respect to each other as shown in Figure 3. Webs 22 interconnect the lower ends of the opposed second portions 21 together, and these webs 22 may be flat. The body member 19 further includes a pair of straight third portions which are indicated by the numeral 23. The third portions 23 extend from the first portions 20 and are arranged intermediate the ends of the first portions, as shown in Figure 3, and webs 24 interconnect the lower ends of the third portions 23 together. The pair of webs 22 and the intermediate web 24 are all arranged in the same plane.

The utensil further includes a pair of similar clamps which are each indicated generally by the numeral 25, and the clamps 25 are mounted for movement towards and away from the sides of the body member 19 so that the tortilla 11 will be clamped between these members and held while it is being cooked as shown in Figure 1. Each of the clamps 25 includes a rod 26, and extending from the ends of the rod 26 and formed integral therewith or secured thereto is a pair of angularly arranged fingers 27. A brace 28 interconnects the pair of fingers 27 together, and the brace 28 is arranged in spaced parallel relation with respect to the rod 26. Each of the fingers 27 terminates in an eyelet 29 which pivotally engages the first portion 20 of the body member 19. Projecting from each of the eyelets 29 is a link 30, and each of the links 30 terminates in an eye member 31 which is pivotally mounted on the base 15 of the handle 14. Portions of the inner surfaces of the clamps 25 may be knurled or roughened as at 32, Figure 5, so as to increase the frictional contact between the utensil and the tortilla 11.

From the foregoing it is apparent that there has been provided a cooking utensil which is especially suitable for use in providing a physical support for a tortilla or taco whereby these articles will be properly shaped or formed during the final cooking process which is incidental to the preparation of the taco. The words "tortilla" and "taco" are Spanish names and the tortilla is a flat unleavened cake which is made of corn or wheat flour and cooked in a flat shape. Taco is defined as a tortilla which is cooked in a U- or V-shape until it is crisp and then the interior portion thereof is filled with morsels of meat and/or salad and vegetables. The utensil includes a body member 19 which has a substantially V-shape and initially the grips or clamps 25 are open to the dotted line position of Figure 4 and then the tortilla is placed over the outer sides of the body member 19 while the clamps 25 are in open position. With the body of the device in an upright position, the tortilla is placed in position against the sides of the device so that the tortilla is supported in a V-shape. Then, the handle 14 is pulled upward to cause the links 30 to actuate the clamps 25 in such a manner as to close them against the tortilla and maintain it in that position. It is to be understood that when the links 30 are moved from the broken line position of Figure 4 to the solid line position of Figure 4 the clamps 25 will be moved to their clamping position to hold the tortilla in place. The entire device is then suspended by the handle and the body of the device or the portion which contains the tortilla 11 is then submerged in a cooking vessel or utensil which contains grease for frying as shown in Figure 1. The handle 14 which is hingedly connected to the main body of the device by means of the base 15, permits the body of the device to move from side to side in pendulum fashion so that the entire tortilla can be cooked. After the cooking process, the handle 14 is pressed towards the body 19 so that the links 30 move from the solid line position of Figure 1 to the broken line position whereby the clamps 25 are opened so that the cooked tortilla is disengaged from its supporting elements.

It is to be understood that the cooking utensil of the present invention can be made in different ways as long as the same result is accomplished.

It is to be noted that due to the angular relation of the handle 14 to the body 19, the clamps 25 are actuated and closed by causing the handle to be pressed against the crossbars or portions 20 on the body 19. When using conventional cooking devices, it is customary for the handle to rest on the basic utensil or part for support. The present invention has a self-supporting handle 14 which reduces the conduction of heat and makes the device suitable for the housewife to leave momentarily while she turns aside to do other tasks. Furthermore, a plurality of tortillas can be contained within the device so that more than one tortilla can be cooked at a time. Furthermore, with the present invention only a minimum amount of grease is required when cooking and the device can be used with shallow fat so that it is quick, easy and economical to use. The present invention physically supports the tortilla during the cooking process, and also shapes the tortilla and produces a series of taco wrappers of uniform shape. The ejection or release of the tortillas after cooking is mechanically or automatically performed by moving the handle 14 and with the webs 22 and 24 resting on a surface, the clamps will open when the handle is actuated. The device can be turned from side to side to thereby insure that the complete surface of the tortilla is exposed to the grease and this is accomplished by the pendulum action of the handle 14. The device can also be held in a slanted position by means of the handle so that the grease can be drained from the tortilla before the tortilla is removed from the cooking utensil. Also, the curved portion of the tortilla is completely free from obstruction and this permits quick frying of that portion which has to cook into shape and maintain the shape for the wrapper. While the drawing shows the device as being made of a material similar to wire, it can be fabricated of any suitable material and the inner surfaces of the clamps 25 are milled or knurled as at 32, Figure 5, to insure that there will be a better clamping and holding action on the tortilla. The ribs or webs 24 and 22 are somewhat flat or straight so that they will hold firm against a surface and will not skid from side to side when the device is being pressed down as when the clamps are being opened.

We claim:

1. In a cooking utensil, a handle including a base, a pair of angularly arranged arms extending from said base and having their upper portions twisted together, a hand grip secured to said arms, a body member having a substantially V-shape and including a first pair of straight portions arranged in spaced parallel relation with respect to each other, second portions arranged angularly with respect to the ends of said first portions and extending therefrom, webs interconnecting the ends of said second portions together, a third portion extending from each of said first portions intermediate the ends thereof, a web interconnecting said third portions together, and a pair of movable clamps mounted for movement towards and away from said body member, each of said clamps including a rod, a pair of angularly arranged fingers extending from the ends of said rod, a brace interconnecting each pair of fingers together and arranged in spaced parallel relation with respect to said rod, said fingers terminating in eyelets pivotally engaging the first portions of said body member, links extending from said eyelets and terminating in eye members, said eye members being pivotally connected to the base of said handle.

2. The structure as defined in claim 1, wherein said webs lie in the same plane, and wherein said clamps have knurling on their inner surfaces.

3. In a cooking utensil, a handle including a base, a pair of arms extending from said base and having their upper portions twisted together, a handle grip secured to said arms, a body member including a first pair of straight portions, second portions arranged angularly with respect to the ends of said first portions and extending therefrom, webs interconnecting the ends of said second portions together, a third portion extending from each of said first portions intermediate the ends thereof, a web interconnecting said third portions together, and a pair of movable clamps mounted for movement towards and away from said body member, each of said clamps including a rod, a pair of fingers extending from the ends of said rod, a brace interconnecting each pair of fingers together, said fingers terminating in eyelets pivotally engaging the first portions of said body member, links extending from said eyelets and terminating in eye members, said eye members being pivotally connected to the base of said handle.

References Cited in the file of this patent

UNITED STATES PATENTS

| | | |
|---|---|---|
| 1,235,447 | Di Giovanni | July 31, 1917 |
| 2,635,528 | Torres | Apr. 21, 1953 |
| 2,664,812 | Molina | Jan. 5, 1954 |